United States Patent
Hofer

(10) Patent No.: US 11,956,097 B2
(45) Date of Patent: Apr. 9, 2024

(54) BATTERY MANAGEMENT SYSTEM AND METHOD FOR DATA TRANSMISSION IN A BATTERY MANAGEMENT SYSTEM

(71) Applicant: Infineon Technologies AG, Neubiberg (DE)

(72) Inventor: Guenter Hofer, St. Oswald (AT)

(73) Assignee: Infineon Technologies AG, Neubiberg (DE)

(*) Notice: Subject to any disclaimer, the term of this patent is extended or adjusted under 35 U.S.C. 154(b) by 255 days.

(21) Appl. No.: 17/343,309

(22) Filed: Jun. 9, 2021

(65) Prior Publication Data

US 2022/0052872 A1 Feb. 17, 2022

(30) Foreign Application Priority Data

Aug. 11, 2020 (DE) .......................... 102020121102.3

(51) Int. Cl.
*H04L 12/40* (2006.01)
*H01M 10/42* (2006.01)
*H01M 10/48* (2006.01)

(52) U.S. Cl.
CPC .... *H04L 12/40032* (2013.01); *H01M 10/425* (2013.01); *H01M 10/486* (2013.01);
(Continued)

(58) Field of Classification Search
CPC .. H04M 2010/4271; H04M 2010/4278; H04L 12/40032; H04L 12/40006;
(Continued)

(56) References Cited

U.S. PATENT DOCUMENTS 5,854,454 A * 12/1998 Upender ........... H04L 12/40163
340/7.53
9,425,992 B2 * 8/2016 Brochi ................ H04L 12/6418
(Continued)

FOREIGN PATENT DOCUMENTS

| CN | 105306323 A | * | 2/2016 |
| CN | 105306323 A | | 2/2016 |
| EP | 3591986 A1 | | 1/2020 |

OTHER PUBLICATIONS

"Shema et al., A Smart Wireless Battery Monitoring System for Electric Vehicles, 2012, IEEE, pp. 189-193" (Year: 2012).*
(Continued)

*Primary Examiner* — Rasheed Gidado
(74) *Attorney, Agent, or Firm* — Shumaker & Sieffert, P.A.

(57) ABSTRACT

A method, in particular for a battery management system, is described. According to one exemplary embodiment, the method comprises providing a digital message which comprises a multiplicity of frames, wherein the multiplicity of frames comprises an ID frame, at least one data frame and a checksum frame. The checksum frame includes a checksum value which has been calculated based on the data included in the other frames. The method further comprises generating a CAN message, wherein the data included in the data frame(s) and the checksum frame are inserted into a data field of the CAN message and wherein an identifier included in the ID frame is inserted into an ID field of the CAN message. The method further comprises transmitting the CAN message via a CAN bus line and receiving the CAN message and reconstructing the digital message.

16 Claims, 5 Drawing Sheets

(52) U.S. Cl.
CPC  *H01M 2010/4271* (2013.01); *H01M 2220/20* (2013.01); *H04L 2012/40215* (2013.01); *H04L 2012/40273* (2013.01)

(58) Field of Classification Search
CPC ..... H04L 12/40169; H04L 2012/40215; H04L 2012/40273; H01M 2220/20
See application file for complete search history.

(56) References Cited

U.S. PATENT DOCUMENTS

| | | | |
|---|---|---|---|
| 10,951,436 B2* | 3/2021 | Maeda | H04L 12/40 |
| 11,409,688 B1* | 8/2022 | Peterson | G06F 13/4221 |
| 2005/0175079 A1* | 8/2005 | Gamper | G01R 13/0254 |
| | | | 375/228 |
| 2014/0023068 A1* | 1/2014 | Kim | H04L 12/40006 |
| | | | 370/355 |
| 2016/0162268 A1* | 6/2016 | Bush | H04L 12/6418 |
| | | | 717/178 |
| 2016/0261127 A1* | 9/2016 | Worry | H02J 7/0029 |
| 2017/0346308 A1 | 11/2017 | Kain et al. | |
| 2020/0011935 A1 | 1/2020 | Juhl | |
| 2021/0313626 A1* | 10/2021 | Deng | G01R 31/382 |

OTHER PUBLICATIONS

Office Action, in the German language, from counterpart German Application No. 102020121102.3, dated Apr. 22, 2021, 6 pp.

\* cited by examiner

UART frames, CRC calculation

UART frame embedding

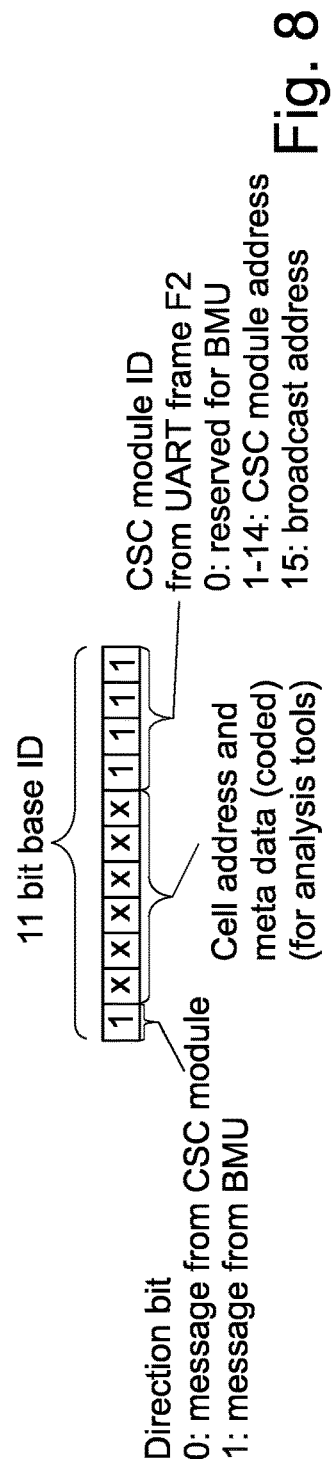

BATTERY MANAGEMENT SYSTEM AND METHOD FOR DATA TRANSMISSION IN A BATTERY MANAGEMENT SYSTEM This Application claims priority to German Application Number 102020121102.3 filed on Aug. 11, 2020, the entire content of which is incorporated herein by reference.

TECHNICAL FIELD

The present description relates to the field of battery management systems and associated methods.

BACKGROUND

Battery management systems (BMS) have the object of monitoring the charging and discharging of a battery composed of a plurality of battery cells or battery blocks (also known as a battery pack). A battery management system can comprise a plurality of modules (for example one module per battery cell) which can each communicate with a control unit. This control unit is often referred to as a battery management unit (BMU, battery monitoring unit). This communication is made possible by means of a digital communication bus. For example, the BMU and the individual modules are arranged in series in a daisy chain. The BMU can be considered to be a master node of the communication bus, whereas the individual modules form the slave nodes with the cell supervision circuits (CSC) included therein. Each bus node has an address and each node transmits received messages to the next bus node, until the message has reached the bus node to which the message is addressed. The structure and the mode of operation of a daisy chain bus topology is known per se (see US 2017/0346308A1, for example) and will not be explained in more detail herein.

Known communication busses which are used in battery management systems use a frame-based serial data transmission, wherein so called UARTS (universal asynchronous receiver transmitter) can be used for the data transmission. A UART transmits data as a serial digital data stream with a fixed data frame (UART frame) which usually consists of a start bit, five to nine data bits, an optional parity bit for identifying transmission errors and a stop bit.

In the automotive sector, different electronic control units (ECUs, electronic control units) usually communicate by means of a CAN (Controller Area Network) or another field bus system. In order to be able to couple a UART-based bus system of a battery management system with an ECU by means of a CAN, a special interface is required which can be referred to as a CAN/UART translator. CAN/UART translators of this type are relatively complex to realize. At least two microcontrollers are required; one for the protocol handling of the CAN protocol and one for safety applications. The software which is run by the microcontrollers must meet the requirements according to ASIL D (Automotive Safety integrity Level D according to ISO26262). In particular in distributed systems with a plurality of daisy chains which are to communicate with an ECU, a plurality of CAN/UART translators are also required, which further increases the technical and economic effort. Furthermore, known CAN/UART translators do not readily support so called Vector Tools (CANalyzer) for analyzing the transmitted data.

It is the object of the inventor to improve existing systems and their efficiency while maintaining safety requirements (ASIL D).

SUMMARY

The above-mentioned object is achieved by the method according to Claim 1, the battery management system according to Claim 13 and the CAN/UART translator module according to Claim 15. Various exemplary embodiments and developments are the subject matter of the dependent claims.

A method, in particular for a battery management system, is described. According to one exemplary embodiment, the method comprises providing a digital message which comprises a multiplicity of frames, wherein the multiplicity of frames comprises an ID frame, at least one data frame and a checksum frame. The checksum frame includes a checksum value which has been calculated based on the data included in the other frames. The method further comprises generating a CAN message, wherein the data included in the data frame(s) and the checksum frame are inserted in a data field of the CAN message and wherein an identifier included in the ID frame is inserted into an ID field of the CAN message. The method further comprises transmitting the CAN message via a CAN bus line and receiving the CAN message and reconstructing the digital message. Furthermore, a corresponding battery management system and a CAN/UART translator module are described.

BRIEF DESCRIPTION OF THE DRAWINGS

Exemplary embodiments are explained in greater detail hereinafter using illustrations. The representations are not necessarily to scale and the exemplary embodiments are not only limited to the aspects represented. In fact, emphasis is placed on representing the principles underlying the exemplary embodiments. In the illustrations:

FIG. 8 illustrates the use of the base ID field of a CAN message for coding the address of a CSC module.

FIG. 9 schematically illustrates the reconstruction of UART frames from a CAN message.

DETAILED DESCRIPTION

Figure 1:
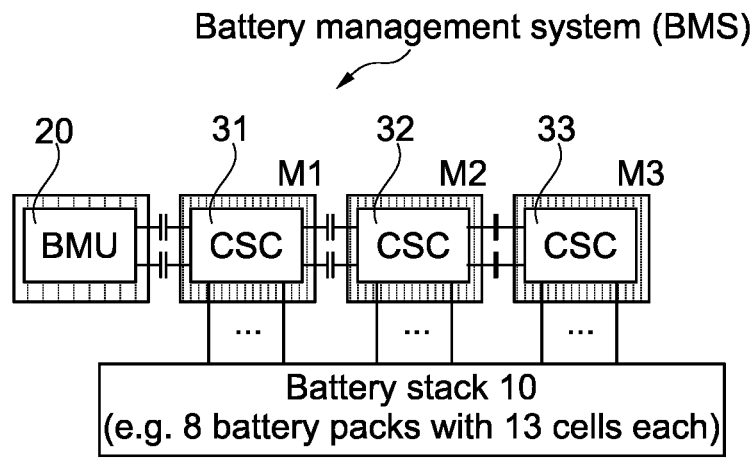
FIG. 1 schematically illustrates one example of a bus system with a BMU and three CSC modules which are connected thereto and are connected to a battery stack.

FIG. 1 schematically illustrates one example of a battery management system (BMS) with a battery monitoring unit (BMU) 20 and a plurality of cell supervision circuits (CSCs) connected thereto. In the present example, three CSCs 31, 32 and 33 are connected to the BMU 20 in a daisy chain. Depending on the application, significantly more than three CSCs can also be arranged in series. The BMU 20 and those of the CSCs 31, 32 and 33 are part of separate modules (also referred to as modules M0-M3 in FIG. 1) which are galvanically isolated from one another and can be arranged on different circuit boards (PCBs, printed circuit hoards). Alternatively, a plurality of CSCs can also be arranged on a PCB. The galvanic isolation can be realized via a capacitive coupling, for example.

The battery 10 which is to be monitored can have a plurality of battery packs (groups of battery cells) with a multiplicity of battery cells in each case. A high-voltage lithium-ion battery with a nominal battery voltage of 400V can have eight battery packs with thirteen cells in each case, for example. Each CSC 31, 32 and 33 is connected to a group of cells and receives the respective cell voltages. Depending on the application, the temperatures of the cells can also be detected. The aforementioned galvanic isolation may be necessary in order to disconnect the different voltage levels of the individual battery cells which are connected in series. The purpose and the basic functions of the BMU 20 and the CSCs 31-33 are known per se and will not be explained in greater detail herein.

With respect to the communication between the BMU 20 and the CSCs 31-33, the BMU 20 represents the master bus node, and the CSCs 31-33 represent the slave bus nodes. The individual modules M0-M3 can have serial communication interfaces (e.g. UARTs) which, as represented in FIG. 1, are serially connected to form a daisy chain by means of a data line. The form and content of the UART data frames will be explained in even greater detail later.

Figure 2:
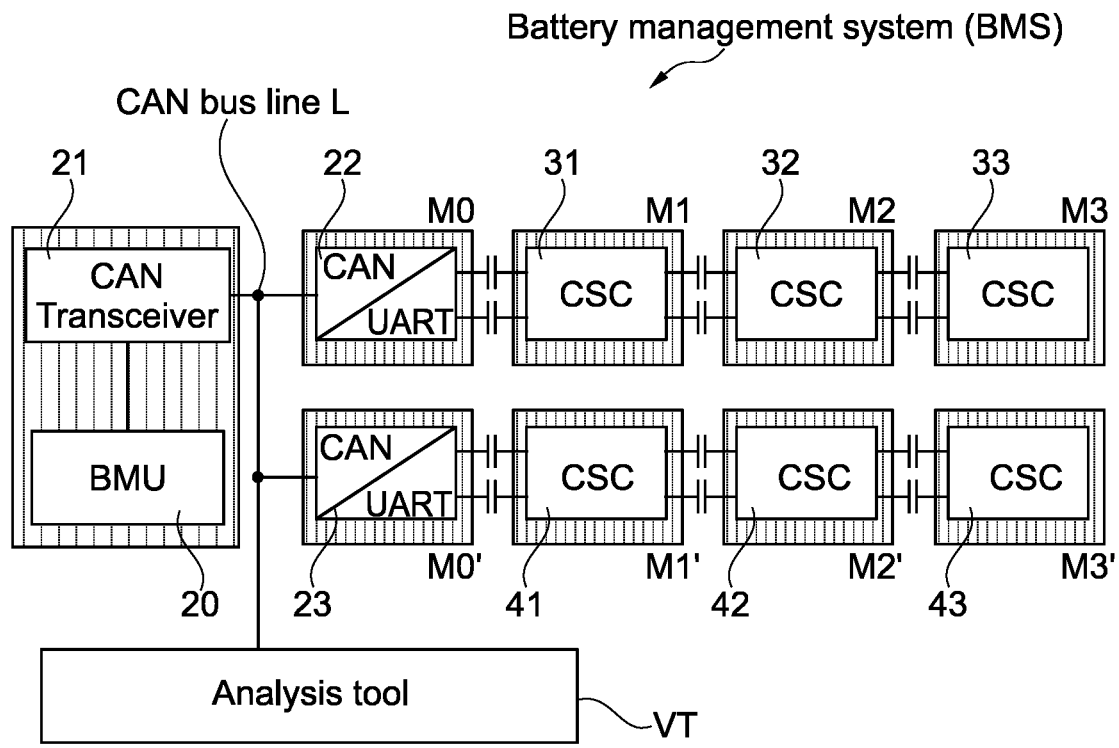
FIG. 2 illustrates one example of a distributed system with a BMU and two chains of CSC modules connected thereto, wherein the BMU has a CAN interface and each of the chains of CSC modules comprises a CAN/UART translator module.

FIG. 2 illustrates one example of a distributed BMS with a BMU and two or more daisy chains with a multiplicity of CSCs. In the present example, a first daisy chain with CSCs 31-33 (modules M1-M3) and a second daisy chain with CSCs 41-43 (modules M1'-M3') are connected to the BMU 20. The connection between the two daisy chains and the BMU 20 is an indirect connection. The electronic control unit ECU, which includes the BMU 20, further has a CAN transceiver, in order to be able to connect the BMU to a CAN bus cable L. The chain of CSCs 31-33 is connected to the CAN bus cable L via a first CAN/UART translator 22, and the chain of CSCs 41-43 is connected to the CAN bus cable L via a second CAN/UART translator 23. In comparison to the system from FIG. 1, the module M0 of the first daisy chain (and likewise the module M0' of the second daisy chain) does not include the BMU, but rather the aforementioned CAN/UART translators 22 and 23.

The structure represented in FIG. 2 makes it possible to couple a distributed BMS with a plurality of chains of CSCs with a BMU which is arranged in a central ECU. The "intelligence"—usually realized by more or less complex software is in the BMU. However, the CAN/UART translators 22 and 23 can be relatively complex modules to implement, since comparatively high requirements are placed on functional safety, in particular in the automotive sector. Different standards must be (in particular ISO26262) and in the case of vehicle batteries the safety integrity level ASIL D is usually required. An analysis tool VT for analyzing the data traffic on the CAN bus is also represented in FIG. 2. Analysis tools of this type (for example the vector tools mentioned above) are known per se and may play an important role in the development process.

Figure 3:
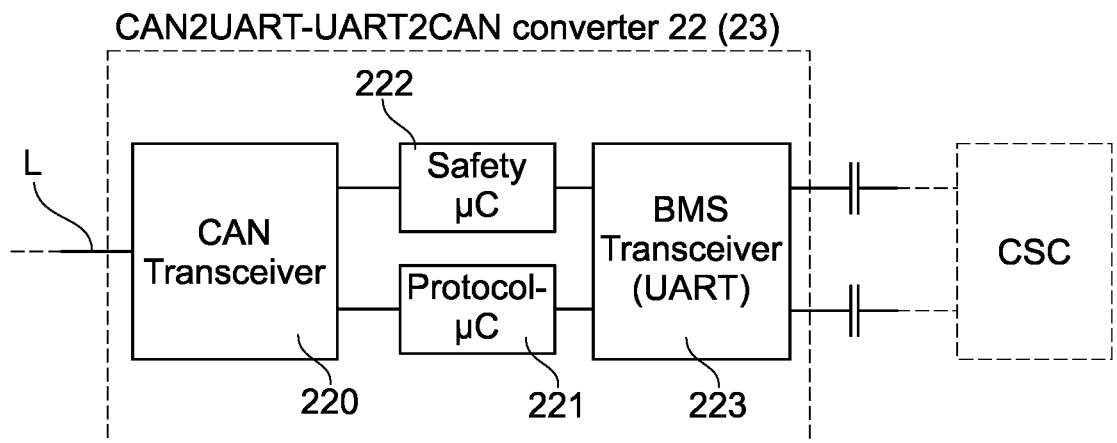
FIG. 3 illustrates one example of one possible implementation of a CAN/UART translator module, wherein a separate microcontroller is used for the protocol handling and for safety applications respectively.

FIG. 3 illustrates one example of a possible implementation of a CAN/UART translator. According to the example represented, a module of this type (see FIG. 2, modules M0, M0') comprises a CAN transceiver 220, a microcontroller 221 which works as a protocol handler, a further microcontroller 222 (safety controller) in which safety applications are performed, and a UART transceiver 223 for connecting the first CSC module of a daisy chain (see FIG. 2, modules M1, M1').

The CAN transceiver 220 as well as the UART transceiver 223 essentially provides (according to the respective standard) the functions of layer 1 (physical layer) of the commonly known OSI model (see ISO/IEC 7498-1:1994). The microcontroller 221, i.e. the protocol handler, essentially provides the functions of layer 2 (data link layer) of the OSI model, i.e. those functions which are also referred to as "CAN protocol" and which concern the CAN message format. The microcontroller 222 provides safety functions which are necessary in order to meet the high requirements of ASIL D. The UART transceiver 223 is connected to the first CSC of the daisy chain via a galvanic isolation, which are symbolized by the capacitors in FIG. 3. The microcontroller 222 is essentially designed to convert the received CAN frames into UART frames, wherein for data protection a CRC value must be calculated via the data included in the UART frames, since this frame conversion results in a change in the data.

The implementation of the protocol handler functions (microcontroller 221) and the safety functions (microcontroller 222) can be technically relatively complex. Furthermore, the CAN/UART translator structure from FIG. 3 does not support any functions for analyzing the data traffic which can be a valuable tool in the development process. Analysis functions of this type are supported by the CAN protocol and are known by the term "vector tools". In this context, software tools of the company Vector Informatik GmbH are practically industry standard and are also known by the term CANalyzer and CANoe. As mentioned previously, the data traffic on the CAN bus lines can be "monitored" and can be allocated to a specific transmitter and receiver by means of the analysis tools VT (cf. FIG. 2).

Figure 4:
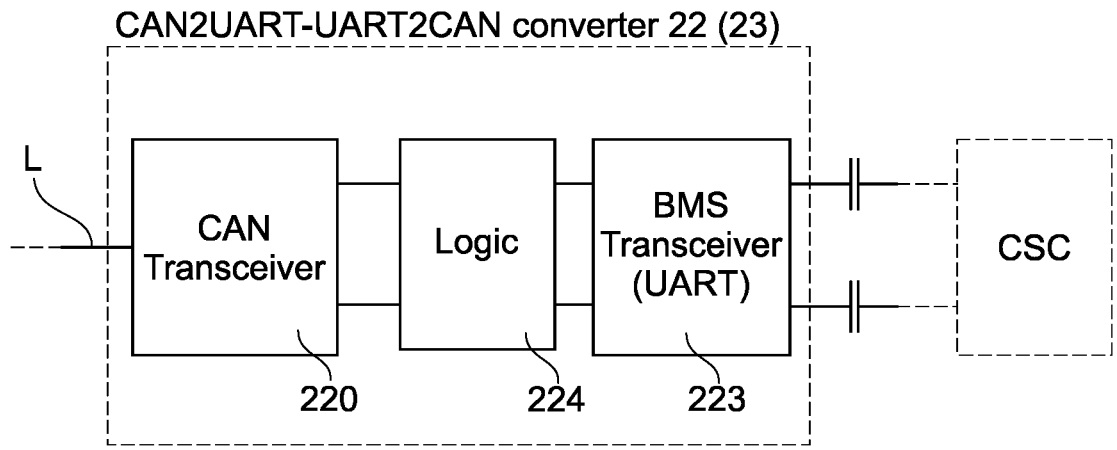
FIG. 4 illustrates one example of an efficient implementation in which neither a protocol handler nor a safety microcontroller is necessary owing to the specific way of data transmission.

The exemplary embodiments described hereinafter seek to simplify and to improve the efficiency of the implementation of the CAN/UART translation and (optionally) to enable the use of vector tools or similar analysis tools in battery management systems. FIG. 4 illustrates a CAN/UART translator according to one exemplary embodiment. According to the example represented, the CAN/UART translator comprises only one CAN transceiver 220, a relatively simple logic circuit 224 and a UART transceiver 223. As in the previous example, the CAN transceiver 220 and the UART transceiver 223 essentially provide the functions of layer 1 of the OSI model. The function of the logic circuit 224 will be explored in even greater detail later. The object of the logic circuit 224 is to convert the bit stream of a CAN message received from the CAN transceiver into UART frames, wherein the data included in the UART frames including a CRC value—are already completely included in the CAN message. This means that the logic circuit 224 can take the bits which are to be packed into the UART frames directly from a CAN message without having to perform complex bit manipulations (see also FIG. 7).

Figure 5:
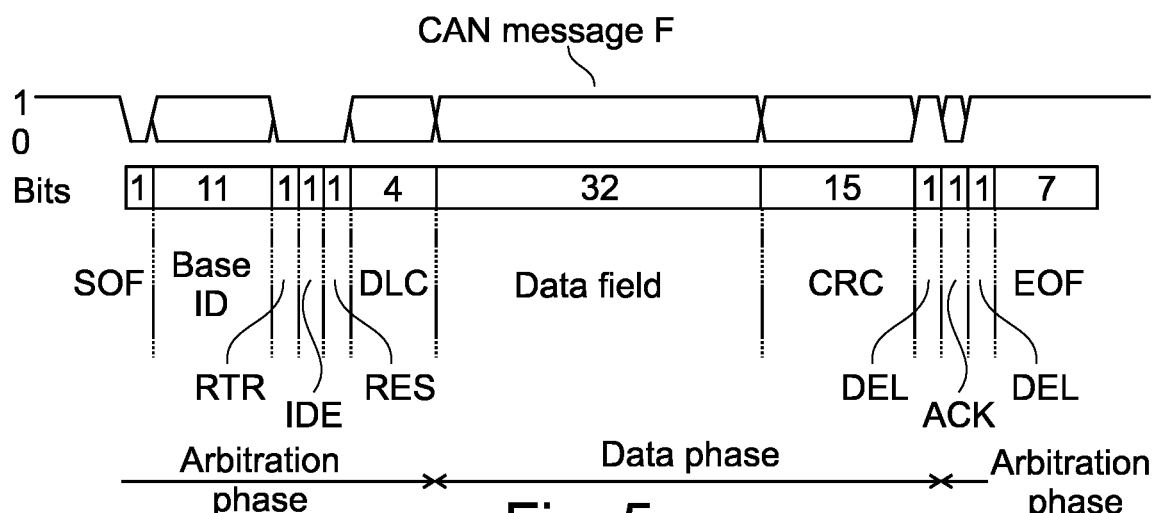
FIG. 5 schematically shows the structure of a CAN message.

Before exploring the actual CAN/UART conversion, the CAN message format which is known per se is represented briefly by means of FIG. 5. CAN supports two message formats which essentially differ in the length of the ID field. In the standard format represented in FIG. 5 (base frame format), the ID field has a length of 11 bits, whereas in the extended format (extended frame format) it is 29 bits long. The bits or bit fields SOF (Start of Frame), RTR (Remote Transmission Request), IDE (identifier Extension), RES (reserved), DLC (Data Length Code), DATA (data field), CRC (Cyclic Redundancy Check, checksum field), DEL (Delimiter), ACK (Acknowledge), and EOF (End of Frame) of a CAN message are commonly known per se and will not be explained in more detail herein. The 11 bit length ID field in the standard format is also referred to as the base ID. This base ID is also present in the extended format, wherein the remaining 18 bits are referred to as the extended ID. The ID must be unique and identifies the message and indicates the priority thereof. If two bus nodes attempt to transmit a message with the same ID, this would result in an error.

Figure 6:
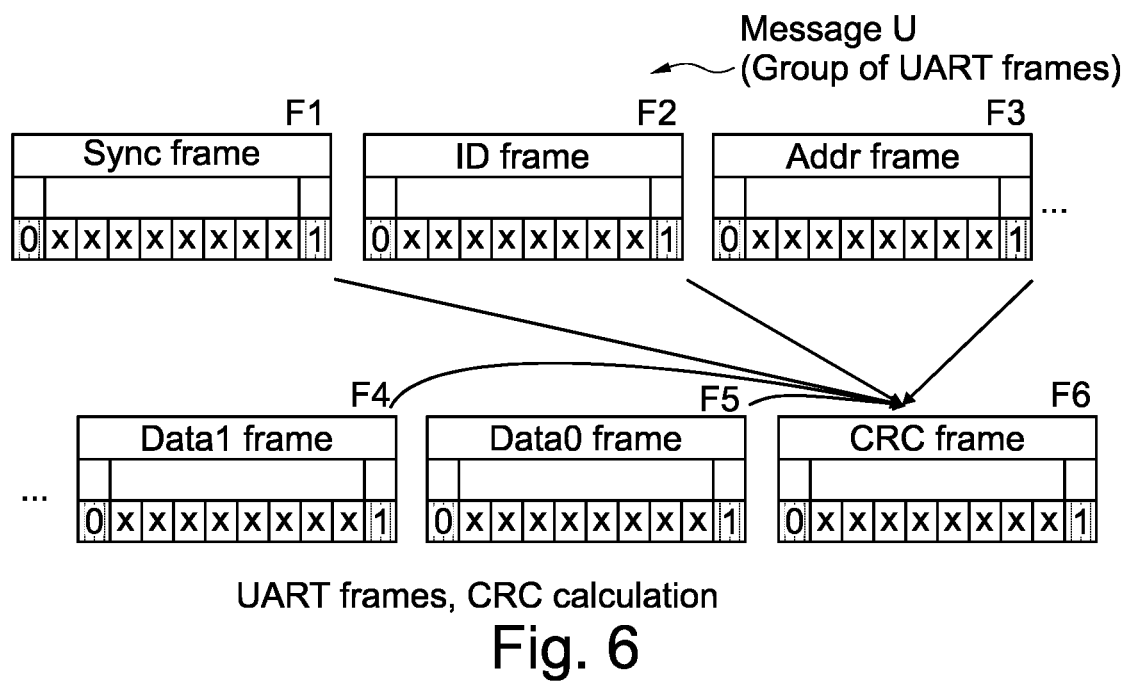
FIG. 6 illustrates, using one example, the structure of one of the UART frames which is used for communication with the CSC modules.

FIG. 6 illustrates in an exemplary manner a group of UART frames, how they can be used for communication with CSC modules. According to FIG. 6, a message U (group of UART frames) comprises six frames F1-F6, wherein each frame has a start bit, eight data bits and 1 stop bit. The special feature of asynchronous data transmission is that the transmitter does not transmit its own clock signal to the receiver on its own control line. Instead, the receiver is synchronized via the length of the frame, which corresponds to the temporal distance of the start and stop bit, and the set bit rate. The sync frame F1 does not include any useful data and is only used for synchronization. The ID frame F2 includes an identifier which refers to a specific CSC module. In the example from FIG. 3, there are six modules M1, M2, M3. M1', M2' and M3' to which the IDs 0001, 0010, 0011, 0100, 0101 and 0110 can be allocated, for example.

The address frame F3 is used for addressing the cells which are allocated to a CSC module. As mentioned previously, a CSC module can monitor a multiplicity of individual battery cells. The data frames F4 and F5 include the data which is to be transmitted (16 bit word) and the CRC frame F6 includes a CRC checksum. It is understood that the message U with six frames F1-F6 represented in FIG. 6 is merely one example. Depending on implementation, the message U can also be structured in a different manner. Irrespective of the implementation, in any case a unique ID can be allocated to each CSC module and a unique address can be allocated to each cell which is monitored by a CSC module.

Figure 7:
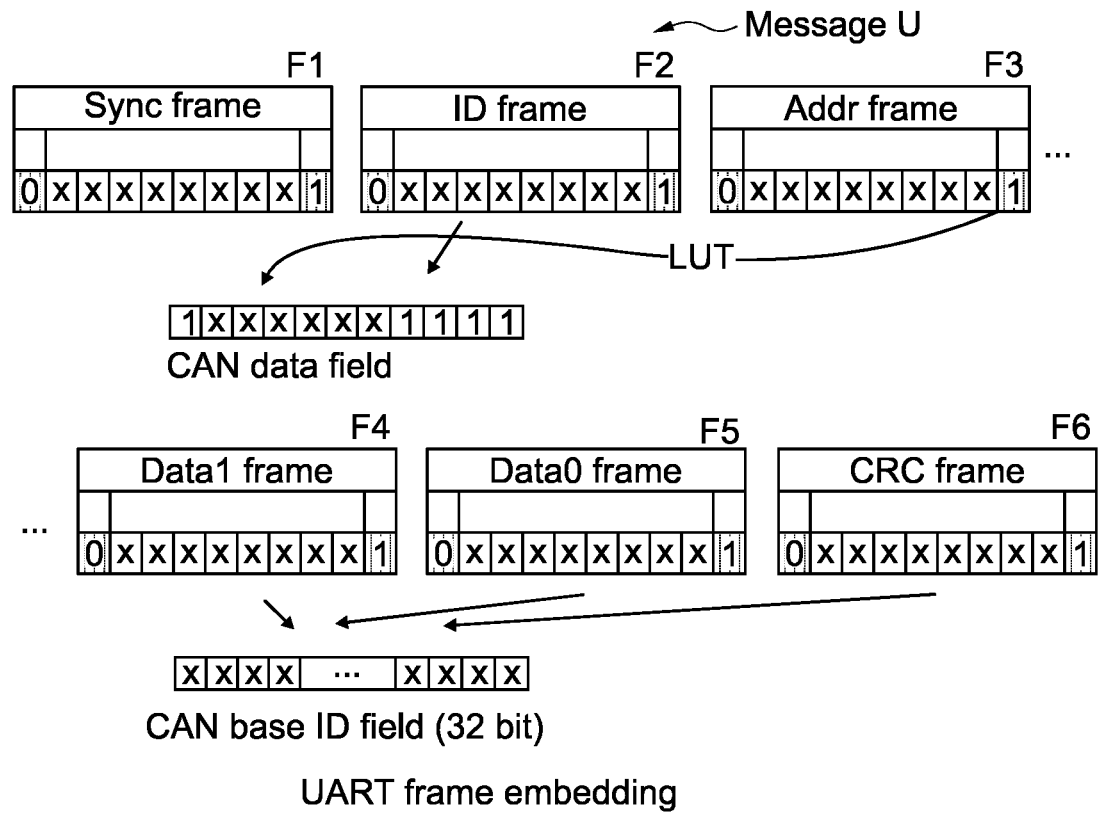
FIG. 7 schematically illustrates the embedding of UART frames into a CAN message with end-to-end protection of the UART frames.

FIG. 7 illustrates a scheme as to how a message U consisting of a group of UART frames is packed/embedded into a CAN message, so that a CAN/UART translation is possible in a relatively simple manner. Depending on the communication direction, the message U is embedded in the BMU (message from a BMU to a CSC module) or in a CAN/UART translator (message from a CSC module to a BMU). In the case of embedding the message U into a CAN message, all redundant data, such as start and stop bits (and optionally parity bits), for example, can be omitted. Even the sync frame F1 does not have to be packed into the CAN message, since the sync frame F1 does not contain any information.

The identifier included in the ID frame F2 is transmitted in a sub-field of the base ID of the CAN message. For example, the identifier of the CSC module is written into the four least significant bits. The address frame F3 and the data frames F4 and F5 as well as the CRC frame F6 are written into the data field DATA of the CAN message, wherein the CRC value included in the CRC frame F6 can be calculated via the data of the frames F1-F5 (or alternatively F2-F5), for example. Since the CRC value is generated in the transmitter of the message U and is also transmitted in the CAN message to the receiver, there is end-to-end protection. Special safety functions are therefore no longer necessary in the CAN/UART translator.

In order to enable the analysis of the communication by means of standardized analysis tools (vector tools, for example CANalyzer, CANoe, or the like), the remaining seven bits of the base ID are used to transmit meta data. For example, the address of the battery cell (content of the address frame F3) as well as further information regarding the transmitted data can be stored in the base ID. In this way, information regarding the type of data in the frames F4 and F5 (for example whether it is temperature values or voltage values) can also be stored, for example. Furthermore, the direction of the communication (from or to the BMU) can be included in the base ID. The direction of the communication can be indicated by the most significant bit (bit 10) of the base ID, for example. Further information can be coded by means of a lookup table LUT and stored in the sub-field with the bits 4-9, for example. As mentioned previously, the bits 0-3 of the base ID represent the identifier of the relevant CSC module. According to one exemplary embodiment, the further information which is coded by means of the lookup table comprises the address included in the address frame. In this case, the content of the address frame does not necessarily have to be transmitted in the CAN data field (which would be redundant).

FIG. 8 schematically illustrates one example of a base ID of a CAN message which has been "filled" with the information from the UART frames. The most significant bit (MSB, bit 10) is on the left. This indicates the direction of the communication, wherein in the example represented, "0" indicates that the message is sent from a CSC module (bus slave) to the BMU (his master). Conversely, a "1" indicates that the message is sent from the BMU to a CSC module. The subsequent six bits (bits 4-9) represent the address of the battery cell and optionally further information (meta data) such as the type of data transmitted (temperature, voltage, etc.), for example. As mentioned previously, the four least significant bits (bit 0-3) represent the identifier of the CSC module. This identifier can be taken directly from the ID frame F1 (see FIG. 6).

FIG. 9 schematically illustrates the reconstruction of UART frames from a CAN message. The content of the data field (in the present example 32 bit) can be distributed directly to the frames F3-F6, the start and stop bits are supplemented. The content of the ID frame F2 can be derived directly from the base ID field of the CAN message. The sync frame F1 can be supplemented in a simple manner since no information is required from the CAN message for this purpose. As mentioned previously, the address does not necessarily have to be transmitted in the CAN data field, but rather the information can also be included in the ID field (optionally coded by means of the lookup table LUT). In this case, the address included in the address frame F3 can also be reconstructed based on the information included in the ID field of the CAN message.

The receiver of the frames F1-F6 (message U) can check the CRC value which has been transmitted in the CRC frame and thus determine whether the integrity of the data is given. The CRC value has been generated directly in the transmitter and has not been changed in the CAN/UART conversion and simply passed on to the receiver (in CRC frame F6). Further functions for data protection are not necessary in the CAN/UART translator.

Figure 10:
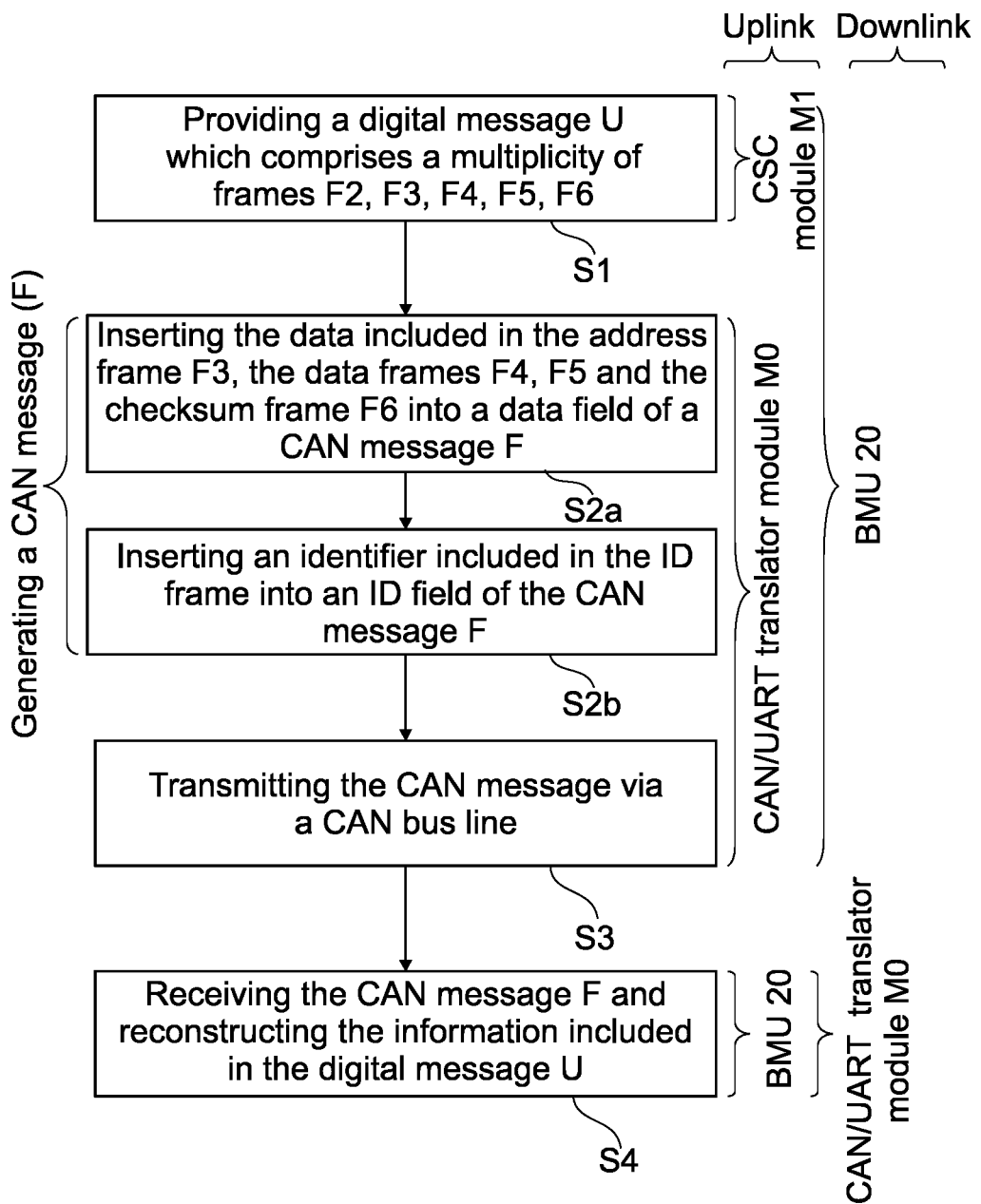
FIG. 10 is a flow diagram for illustrating one exemplary embodiment of the method described herein for exchanging data between CSC modules and a battery monitoring unit (BMU).

The exemplary embodiments described herein and their mode of operation are summarized hereinafter. FIG. 10 is a flow diagram for illustrating one example of the method described herein for exchanging data between CSC modules (cf. FIG. 2, CSC modules M2, M3, etc.) and a BMU (cf. FIG. 2, BMU 20). According to FIG. 10, the method comprises providing a digital message U (cf. FIG. 6) which comprises a multiplicity of frames, wherein the multiplicity of frames comprises an ID frame F2, an address frame F3, at least one data frame F4, F5 and a checksum frame F6 which includes a checksum value which has been calculated based on the data included in the other frames (see FIG. 10, step S1). The method further comprises generating a CAN message (cf. FIG. 7), wherein the data included in the address frame F3, the data frame F4, F5 and the checksum frame F6 are inserted in a data field of the CAN message (see FIG. 10, step S2a) and wherein an identifier included in the ID frame is inserted into an ID field of the CAN message (see FIG. 10, step S2b). Generating the CAN message F from the UART message U has already been explained previously with reference to FIGS. 7 and 8. As mentioned previously, the fact that the CRC value is transmitted with the CAN message F enables end-to-end protection of the transmitted data. Finally, the CAN message F is emitted via the CAN bus line (see FIG. 10, step S3). The CAN message F is received by the receiver and the digital message U (or the data/information included therein) is reconstructed therefrom (see FIG. 10, step S4). The integrity of the original message U can be checked by means of the CRC value transmitted in the CAN message F.

The data transmission represented in FIG. 10 is possible in both directions, i.e. from the BMU 20 to the CSC modules M1, M2, . . . , M1', M2', etc. (downlink direction) and from the CSC modules to the BMU (uplink direction). In the case of uplink communication, the digital message U is provided by one of the CSC modules, i.e. step S1 is carried out by the respective CSC module. Generating the CAN message F (steps S2a and S2b) as well as transmitting the CAN message F (step S3) is carried out by the CAN/UART translator module M0, M0' (cf. FIG. 2) with which the transmitting CSC module is coupled via the data line. Receiving the CAN message and the reconstruction of the original digital message U takes place in the BMU 20.

In the case of downlink communication, the digital message U is provided by the BMU 20, i.e. step S1 (including calculating the CRC value) is carried out by the BMU. Generating the CAN message F (steps S2a and S2b) as well as transmitting the CAN message F (step S3) is also carried out by the BMU. The transmitted CAN message is received (step S4) by one of the CAN/UART translator modules M0, M0' (cf. FIG. 2). The CAN/UART translator modules M0, M0' can identify by means of the ID field of the CAN message F for which CSC module the message is intended, and the reconstruction of the original digital message U takes place at least in that CAN/UART translator module which is connected to the respective CSC module.

According to the examples described herein, in the case of downlink communication, the method comprises transferring the reconstructed digital message U by means of serial data transmission via a data line to one or a plurality of CSC modules which are determined by the identifier included in the ID frame. The identifier can also represent a broadcast, i.e. in this case all CSC modules are addressed. The CSC modules M1, M2, . . . , M1', M2', etc. can each be coupled with a plurality of battery cells. An address included in the address frame F3 (see FIG. 7) refers to a specific battery cell to which the data included in the at least one data frame F4, F5 are related. These data can—in particular in the case of an uplink communication—represent a cell voltage and/or a cell temperature of the battery cell, for example. In the case of a downlink communication, the data included in the data frame(s) F4, F5 can represent control commands, configuration data and/or the like, for example.

According to one specific exemplary embodiment, the process mentioned previously of generating the CAN message F based on the digital message U further comprises coding the address included in the address frame F3 and inserting this coded address into the ID field of the CAN message F. This coding can take place by means of a lookup table (cf. FIG. 7, lookup table LUT), for example. Furthermore, a bit can be set in the ID field of the CAN message F which indicates whether the CAN message is transmitted from the battery monitoring unit (20) or to the battery monitoring unit (20) or vice versa (cf. FIG. 8). This bit (direction bit) therefore indicates whether a specific message is an uplink or a downlink communication.

One further exemplary embodiment relates to a battery management system (BMS) with a battery monitoring unit (BMU), which may be included in an ECU of a vehicle, for example, with a translator module (cf. FIG. 2, CAN/UART translator M0), which is connected to the BMU via a CAN bus line, and with a multiplicity of CSC modules which are connected to form a daisy chain (see FIG. 2, for example CSC modules M1-M3) and which are connected to the translator module by means of a data line. The translator module and the CSC modules are designed to exchange digital messages U by means of asynchronous serial data transmission via the data line, wherein the digital messages each comprise a multiplicity of frames (cf. FIG. 6) which each comprise an ID frame, an address frame, one or a plurality of data frame as well as a checksum frame (CRC frame). The latter includes a checksum value which has been calculated based on the data included in the other frames (which enables the previously mentioned end-to-end protection of the data). The translator module is designed (for the uplink communication) to generate a corresponding CAN message F based on a digital message U received from the CRC modules, wherein the data included in the address frame, the data frame(s) and the checksum frame are inserted into the data field of the CAN message F and wherein an identifier included in the II) frame is inserted into the II) field of the CAN message. The ID and data field of the CAN message are standardized, as explained in detail previously. The translator module can subsequently transmit the CAN message to the BMU via a CAN bus line. The BMU is designed to receive the CAN message F from the translator module and to reconstruct the information included in the digital message U from which the CAN message has been generated.

The CAN/UART translation can be implemented by a logic circuit included in the translator module M0, for example. This logic circuit can comprise a finite state machine (FSM), for example. Furthermore, the logic circuit may contain hard-wired or one-time programmable logic as well as a processor which is designed to run software instructions and therefore to provide the necessary functions. It is understood that a multiplicity of practically equivalent options is known to the person skilled in the art for implementing the functions of the exemplary embodiments described herein.

The invention claimed is:

1. A method comprising:
providing a digital message comprising a multiplicity of frames, wherein the multiplicity of frames comprises:

an identification (ID) frame,
one or more data frames, and
a checksum frame including a checksum value calculated based on data included in the ID frame and the one or more data frames;
generating a controller area network (CAN) message by:
inserting data included in the one or more data frames and the checksum frame into a data field of the CAN message; and
inserting an identifier included in the ID frame into an ID field of the CAN message;
transmitting the CAN message via a CAN bus line;
receiving the CAN message;
verifying the CAN message based on the checksum value inserted into the data field of the CAN message; and
reconstructing the digital message based on the CAN message.

2. The method of claim 1, wherein the digital message further comprises an address frame, and wherein the checksum value is further calculated based on data included in the address frame.

3. The method of claim 1,
wherein the digital message is provided by a battery cell monitoring module of a plurality of battery cell monitoring modules of a battery management system,
wherein the ID from includes an identifier corresponding to the battery management system, and
wherein the CAN message is received by a battery monitoring unit of the battery management system.

4. The method of claim 1,
wherein the digital message is provided by a battery monitoring unit of a battery management system, and
wherein the CAN message is received by a translator module configured to reconstruct the digital message.

5. The method of claim 1, further comprising transferring the reconstructed digital message using serial data transmission via a data line to one or more receivers indicated by the identifier included in the ID frame.

6. The method of claim 5, wherein the one or more receivers comprise a plurality of battery cell monitoring modules connected to the data line.

7. The method of claim 6, wherein the plurality of battery cell monitoring modules are connected to form a daisy chain, and wherein a battery cell monitoring module of the plurality of battery cell monitoring modules is connected to the data line.

8. The method of claim 3, wherein the plurality of battery cell monitoring modules are connected to a plurality of battery cells, and wherein an address included in an address frame refers to a battery cell of the plurality of battery cells corresponding to the data included in the one or more data frames.

9. The method of claim 8, wherein the data included in the one or more data frames indicate one or both of a cell voltage of the battery cell and a cell temperature of the battery cell.

10. The method of claim 2, wherein generating the CAN message further comprises:
coding an address included in the address frame; and
performing one or both of:
inserting the coded address into the ID field of the CAN message; and
inserting the coded address into the data field of the CAN message.

11. The method of claim 10, wherein coding the address comprises using a lookup table.

12. The method of claim 4, wherein generating the CAN message further comprises setting a bit in the ID field of the CAN message, the bit indicating whether the CAN message is transmitted from the battery monitoring unit or to the battery monitoring unit.

13. A battery management system comprising:
a battery monitoring unit;
a translator module connected to the battery monitoring unit via a controller area network (CAN) bus line; and
a multiplicity of battery cell monitoring modules that form a daisy chain and are connected to the translator module by a data line,
wherein the translator module and the battery cell monitoring modules are configured to exchange a set of digital messages according to asynchronous serial data transmission via the data line,
wherein the set of digital messages each include a multiplicity of frames, comprising:
an identification (ID) frame,
one or more data frames, and
a checksum frame including a checksum value calculated based on the data included in the ID frame and the one or more data frames, and
wherein the translator module is configured to:
receive, from the battery cell monitoring modules, a digital message of the set of digital messages;
generate a CAN message based on the digital message by:
inserting data included in the one or more data frames and the checksum frame into a data field of the CAN message; and
inserting an identifier included in the ID frame into an ID field of the CAN message; and
transmit the CAN message to the battery monitoring unit via a CAN bus line.

14. The battery management system of claim 13, wherein the battery monitoring unit is configured to:
receive the CAN message from the translator module; and
reconstruct the information included in the digital message based on the CAN message.

15. A controller area network/universal asynchronous receiver transmitter (CAN/UART) translator module comprising:
a UART interface configured to connect a plurality of battery cell monitoring modules, wherein the plurality of battery cell monitoring modules are connected to form a daisy chain via a data line;
a CAN transceiver for connecting a battery monitoring unit via a CAN bus line; and
a logic circuit configured to:
transmit and receive a set of digital messages using asynchronous serial data transmission via the data line, wherein the set of digital messages each comprise a multiplicity of frames, comprising: which each comprise
an identification (ID) frame,
one or more data frames, and
a checksum frame including a checksum value calculated based on the data included in the ID frame and the one or more data frames; and
generate a CAN message based on a received digital message of the set of digital messages by:
inserting data included in the one or more data frames and the checksum frame in a data field of the CAN message; and
inserting an identifier included in the ID frame into an ID field of the CAN message; and
transmit the CAN message via the CAN bus line.

16. The CAN/UART translator module of claim 15, wherein the logic circuit is further designed to:
   receive the CAN message;
   reconstruct the digital message based on the CAN message; and
   transmit the reconstructed digital message via the data line.

* * * * *